June 24, 1969

R. I. GENIN 3,451,301

CREATIVE MUSICAL MECHANISM

Filed March 8, 1967

INVENTOR.
ROBERT I. GENIN
BY
ATTORNEY

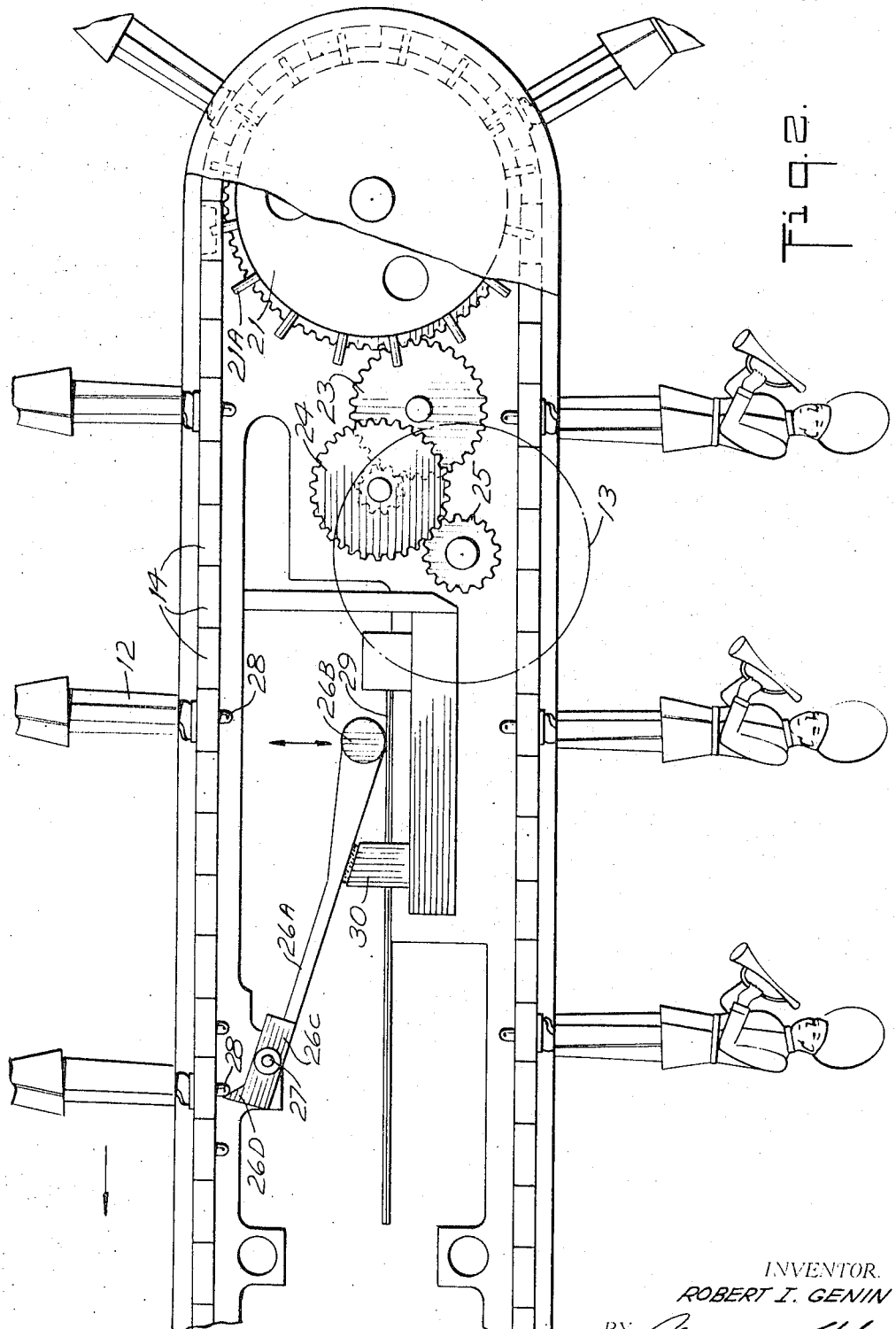

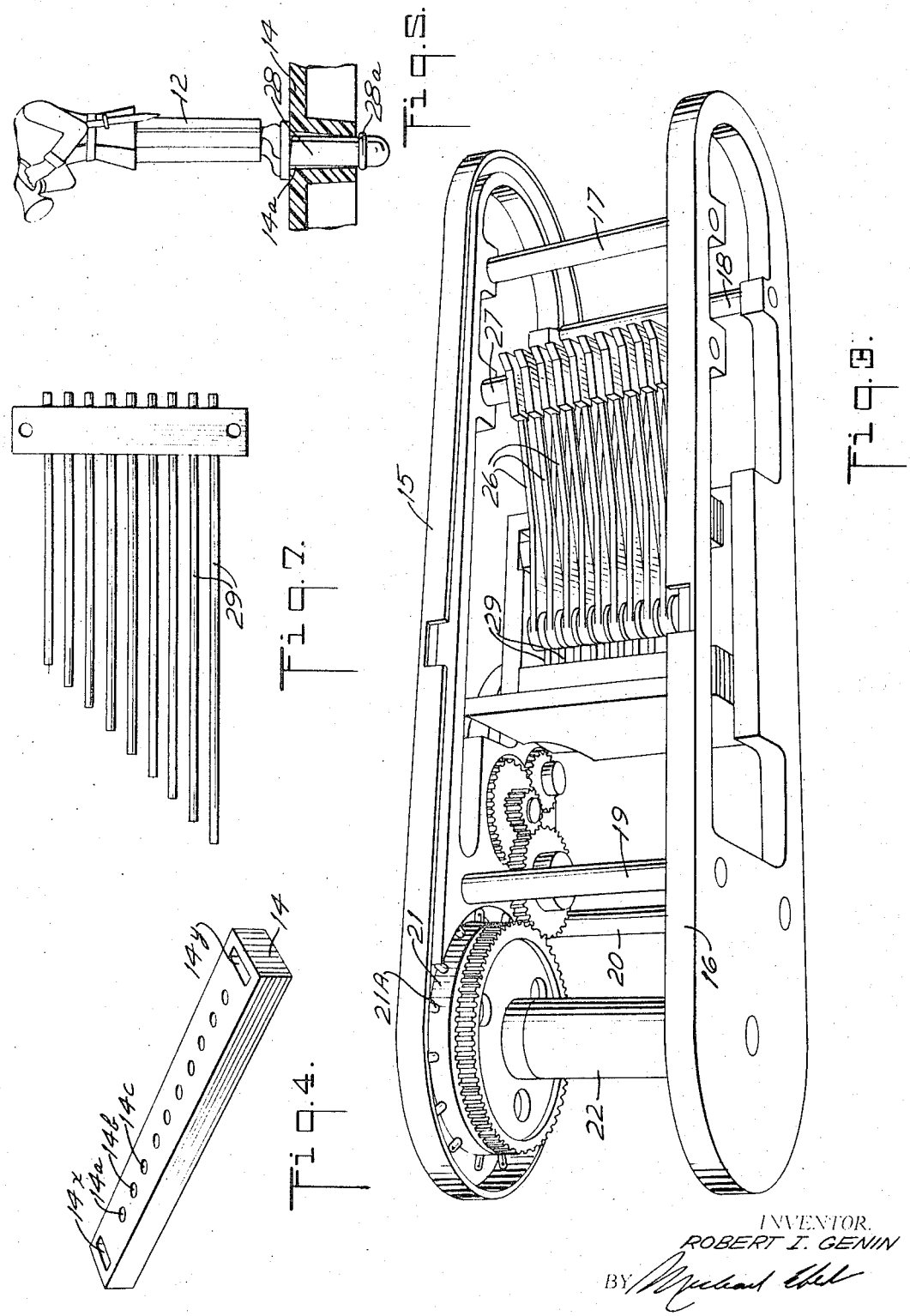

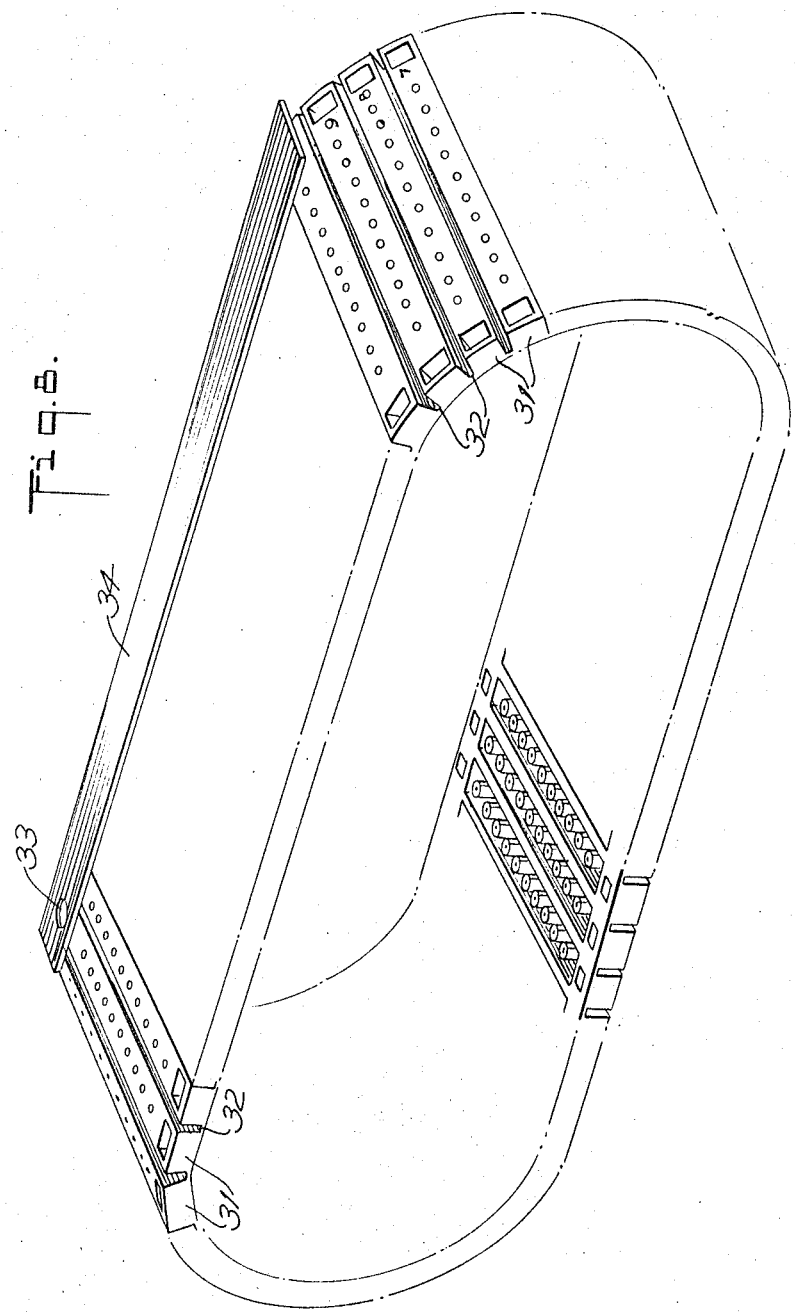

United States Patent Office 3,451,301
Patented June 24, 1969

3,451,301
CREATIVE MUSICAL MECHANISM
Robert I. Genin, Scarsdale, N.Y., assignor to Child Guidance Toys Inc., Bronx, N.Y., a corporation of New York
Filed Mar. 8, 1967, Ser. No. 621,699
Int. Cl. G10f 1/08
U.S. Cl. 84—102                          6 Claims

ABSTRACT OF THE DISCLOSURE

A creative musical mechanism formed by an endless platform having uniform rows of apertures for receiving pins in any desired pattern, the pins projecting from the undersurface of the platform to engage the actuating elements of a bank of hammers which act to strike corresponding chimes to produce melodic effects as the platform is advanced

---

This invention relates generally to creative musical mechanisms, and more particularly to a musical toy constituted by a simulated band of toy players in parade formation conveyed on a moving platform and producing musical effects which depend on the number and orientation of the players in the formation.

Musical toys are known which make use of sound-producing elements activated in a predetermined sequence. In one form of such toy, the elements are struck by hammers which are operated by a mechanism coupled to wheels of a carriage, such that as the carriage is pulled, a given sequence of tones is produced. The drawback of such arrangements and other forms of musical toys, is that the musical effects or tune produced by the toy cannot be changed and is always repeated when the toy is operated. Hence the toy lacks creative aspects. The child playing therewith quickly wearies of the familiar musical effects and tends to discard the toy.

Accordingly, it is the main object of the invention to provide a musical mechanism including a set of chimes operated by a bank of hammers which are activated by a conveyor mechanism wherein removable pins supported on a moving platform engage the hammers to produce musical effects determined by the formation or pattern of the pins, which formation may be varied by the player. While the mechanism lends itself to use as a toy, it also has significant creative and educational aspects, for the player is able to compose music with the mechanism and to produce original musical effects.

A salient advantage of the invention is that the child is able to create musical chords and harmonic and melodic effects in varying degrees of complexity and to hold notes for a full beat or doubled in time for half-beat soundings. In creating a new musical composition, the child at the same time produces a new formation on the moving platform, thereby varying the visual effect of the toy.

More specifically, it is an object of the invention to provide a mechanism of the above-described type in which the conveyor mechanism includes an endless platform having a uniform array of perforations adapted to receive in successive rows of perforations a changeable pattern of pins which support simulated musicians or other costumed figures standing on the platform, the pins extending through the platform to engage the actuating elements of a bank of hammers, such that as the platform is moved, the hammers are selectively activated by the pins to strike corresponding chimes. By varying the length of the pins it becomes possible to vary the relative timing of the sounds produced by a group of pins.

Also an object of the invention is to provide a musical toy which is of sturdy construction, which operates efficiently, and which may be manufactured at relatively low cost.

Briefly stated, these objects are attained in a musical toy which in a preferred form, is constituted by a band of musicians, each represented by a figure provided with a mounting pin which is receivable in any aperture of an endless platform having a uniform array of apertures disposed in successive rows, the platform being moved by a crank-operated or motorized conveyor mechanism whereby the figures appear to march in a parade formation whose pattern is created by the number and orientation of the figures on the platform, the mounting pins extending through the platform and engaging the actuating elements of a bank of hammers equal in number to the number of apertures in a row thereof, the hammers when activated striking a corresponding chime in a set thereof.

For a better understanding of the invention, as well as other objects and further features thereof, reference is made to the following detailed description to be read in conjunction with the annexed drawing wherein:

FIG. 2 is an elevational view of the conveyor assembly;

FIG. 3 shows the conveyor assembly in perspective, the chain of strips forming the movable platform being removed to expose the underlying bank of hammers and the set of chimes struck thereby;

FIG. 4 is a perspective view of a single strip;

FIG. 5 is a sectional view of a portion of the strip, with an individual player mounted thereon;

FIG. 7 is a plan view of the set of chimes; and

FIG. 8 is a perspective view of a modified form of conveyor belt.

Figure 1:
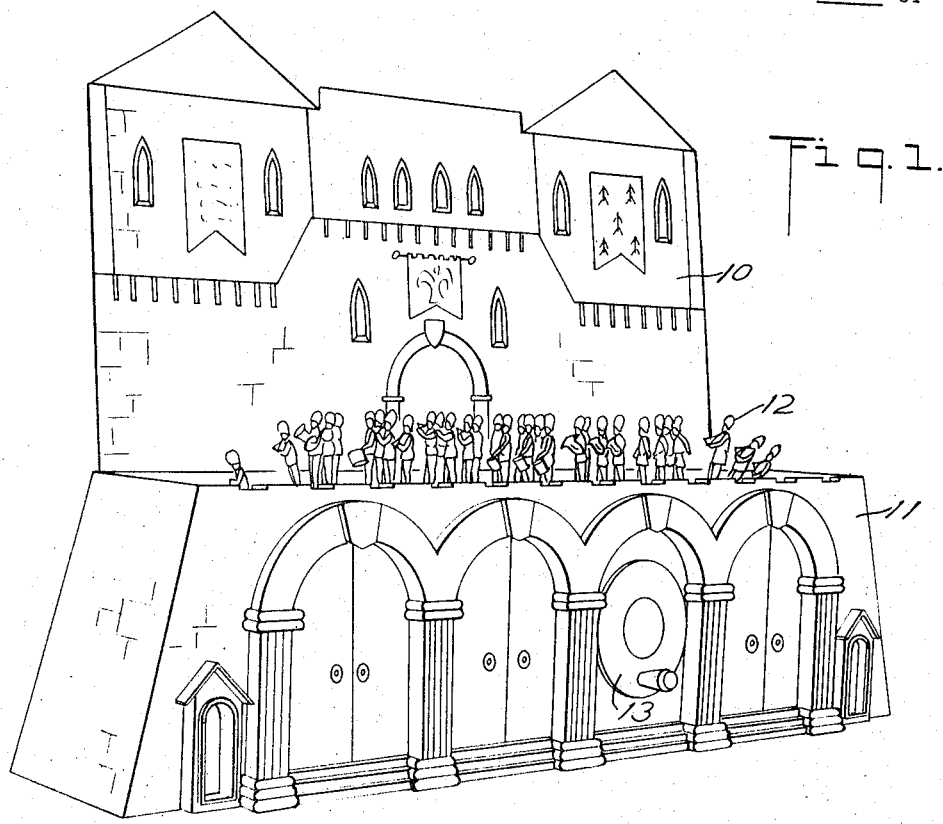
FIG. 1 shows in perspective a preferred embodiment of a musical toy in accordance with the invention, the toy including a bridge incorporating a conveyor assembly which is provided with a moving platform for advancing a band of figures in parade formation.

Referring now to FIG. 1, the toy according to the invention includes the facade of a castle 10 before which is erected an arched bridge 11 of trapezoidal shape, having guardhouses at either end. Moving in review across the bridge is a military band in parade formation. The band is composed of figures 12 in military or guardsman dress, each figure carrying a musical instrument, such as a drum or trumpet.

The figures are supported on the moving endless platform of a conveyor assembly which is concealed within the bridge. The upper stretch of the platform forms the street of the bridge, and as the platform advances, the bandsmen appear to march smartly past the castle. Hidden within the conveyor assembly is a bank of hammers which cooperate with a set of chimes. As row after row of figures march over the bank of hammers, the hammers whose positions correspond to those of the figures in each row are activated to strike the chimes associated therewith to produce musical effects which depend on the number and orientation of the figures in the formation.

The conveyor assembly is operated manually by a crankwheel 13, and as the wheel is turned, the members of the band rise up in an arcuate path at one end of the bridge, then straighten out on the horizontal stretch of the platform and march slowly across the bridge, at the other end of which they descend in an arcuate path. The marching is accompanied by music played on the hidden chimes or by other musical effects depending on the particular parade formation of the figures.

Referring now to FIGS. 2 and 3, which illustrate the conveyor assembly, it will be seen that FIGURES 12 are mounted along an endless platform constituted by a continuous chain of individual strips 14 which are slidable in guide channels 15A and 16A (note FIG. 6) formed in a pair of parallel frame members 15 and 16 having an oval configuration and held together by cross-bars 17, 18, 19 and 20. The strips, which in practice may be fifty-four in number, are inserted within the guide channels through slots 15B and 16B whose width is just sufficient to admit the strips.

Figure 6:
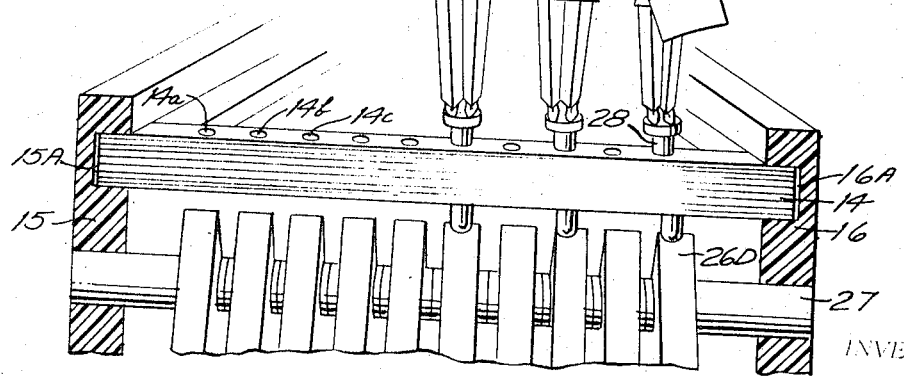
FIG. 6 is a transverse section taken through the conveyor assembly.

Each strip 14, as best seen in FIGS. 4 and 6, is provided with a row of equi-spaced round apertures 14a, 14b, etc., ten being shown, and two square sprocket holes 14X and 14Y adjacent the opposite ends of the strip. The strips forming the platform are advanced by means of a sprocket wheel 21 having radial spokes 21A which engage the sprocket holes 14X in the chain of strips, the wheel being mounted on a shaft 22 journaled in the frame members 15 and 16.

Sprocket wheel 21 is turned by a train of gears 23 and 24 operated by a pinion 25 coupled to the manually-operated crankwheel 13. Thus as wheel 13 is cranked, the sprocket wheel is caused to turn to advance the platform strips within their guide channels and thereby move the figures mounted thereon in a continuous path at a speed depending on the gear ratio of the gear train and the rate at which the crankwheel is turned.

It is not necessary to use a gear arrangement and in practice the belt may be driven by friction wheels. Also in operation, the operation need not be manual and may be motorized.

Supported within the conveyor assembly and encircled by the endless platform, is a bank of hammers 26, pivotally arranged on a shaft 27 extending between the frame members. Each hammer, as best seen in FIG. 2, includes a lever arm 26A terminating at one end in a hammer head 26B, the other end of the arm being connected to an actuating element 26C having a tooth 26D projecting upwardly therefrom to a point just below the platform. The actuating elements are aligned with the apertures 14a, 14b, etc. in the strips.

Pieces 12 are preferably molded of semi-rigid plastic material, such as vinyl. The arms and the instruments are molded separately and snapped into the body, so that the arms are movable for realism. In an actual embodiment, the figures are replicas of Scots Guards Bandsmen, which may be hand-painted in different colors. Each figure is provided with a supporting pin 28 projecting downwardly from the foot thereof. To mount the figure on the strip, the pin thereof is inserted in one of the round holes in strip 14. Pin 28 is provided with a small bead 28a adjacent the rounded tip thereof to afford a snap-in action. The bead lies just below the underside of the strip to hold the figure in position and to prevent the figure from dropping out when inverted by the moving conveyor platform.

Also supported within the conveyor assembly is a set of chimes 29, one for each hammer in the bank thereof, the chimes being of progressively different length to produce different tones when struck. In operation, as the platform bearing the pieces 12 advances, the pins 28 on each strip engage the teeth 26D on the correspondingly positioned actuating element 26 of the hammers, thereby causing the hammer head to swing upwardly until the pins leave the teeth, at which point the raised hammers fall upon the associated chimes to strike tones.

The hammers do not fall directly on the chimes, for a cushioning element 30 is interposed in the path of the lever arms 26A. Element 30 is provided with a bed of polyurethane, soft rubber or felt material whereby only the drop momentum carries the hammer past the bed to strike the note but not to lay on it. Thus the hammer does not rest on the associated chime, and the resonance of the struck chime is not dampened.

Thus if a strip containing only a single figure passes over the actuating elements of the hammers, only one note will be struck, but if several figures are mounted on the strip, an equal number of different tones will be struck, thereby producing a chord. With ten apertures in each strip and fifty-four strips forming the platform, given, say, eighty figures, it will be evident that a wide variety of musical effects can be created, for this arrangement has a large range of musical possibilities. It is also possible to make multiple figures having, say, three pins, with a pre-determined spacing, which when inserted in the related apertures in a strip, will produce a pre-arranged chord.

By the number and separation of figures placed on each strip, as well as the spacing between strips on which figures are mounted, for one need not place figures on all strips, a band formation is created in which the distinctive pattern of figures on the moving platform produces melodic effects which are directly related to the pattern.

Instruction sheets may be provided for setting up a variety of musical compositions and parade formations. To assist such set-up, the chain of strips may be numbered and the holes thereon identified by suitable notation. Obviously, the player, if he chooses may create any pattern or effect which pleases him. The player, by the rate at which he turns the crank, can control the tempo of the musical effect as well as the marching speed of the band.

While the moving platform is shown as composed of individual strips, it will be appreciated that comparable effects may be obtained with a flexible endless belt having suitable apertures thereon for mounting the figures.

In the embodiment shown, the pins or studs all have the same length. Alternatively, these pins may be made of varying length so that they protrude to different degrees through the platform. In this way, although the pins lie on the same row, the notes activated thereby will not be struck simultaneously. In other words, notes will be held for a full beat or doubled in time for half-beat soundings.

The length of the pin determines the height at which the associated hammer is raised. The shorter the height, the sooner the hammer will be released from its related tooth, making the hammer strike sooner than the hammer activated by a longer pin. Different lengths of pins can be identified by differences in the colors of the uniforms of the associated figures or by differences in the instruments carried by these figures. The pins may also be color-coded, and the holes on the platform may also be color-coded to facilitate insertion in accordance with an instruction sheet.

A preferred form of endless platform is shown in FIG. 8, where it will be seen that the platform is not composed of individual strips or slats, but by a unitary belt formed by molded slats 31 integral with so called "living hinges" 32. The entire structure is molded of polypropylene. The nature of this material is such that with continued bending of the hinges, they are not weakened but strengthened, for the material is caused to undergo orientation.

In assembling a toy with a belt of this type, the belt is made into an oval and inserted into the oval channel in one side piece of the frame, the other side piece then being fitted onto the other side of the belt, before being joined to the first side piece. In practice, each slat may be provided with a number, which can be seen through a window 33 in a top retainer plate 34, so that only the number of the slat whose pins are active is visible therethrough. By knowing which slat is in its active position, this facilitates setting up the pins in accordance with an instruction sheet.

The toy is not limited to marching bands and other representational figures, for the pins may be attached to abstract pieces to provide musical effects, depending on their formation on the platform. Obviously, the basic mechanism can also be used as a tool for musical instruction and education, rather than as a toy.

While there has been shown and described preferred embodiments of a musical mechanism in accordance with the invention, it will be appreciated that many changes and modifications may be made therein.

What I claim is:

1. A musical mechanism comprising:
   (a) an endless platform having successive transverse rows of apertures thereon, all rows having an equal number of apertures, said platform being formed by a chain of strips movable in guide channels having the configuration of an oval trackway, each strip in said chain having a row of apertures therein,
   (b) a plurality of pieces attachable to said platform in any desired parade formation, each piece being formed of a figure representing a marcher in the parade and including a pin insertable in an aperture in said row and projecting therefrom,
   (c) a bank of pivotally-arranged hammers equal in number to the number of apertures in said row and disposed below said platform in alignment with one of said rows, each hammer including an actuating element at one end and hammer head at the other, each of said elements having a tooth engageable by a correspondingly positioned pin to raise the associated hammer head,
   (d) means to move said platform whereby the pieces appear to be marching in a parade formation and said pins selectively actuate said hammers, and
   (e) a set of sound-producing elements cooperating with said hammer heads to produce music to accompany the marching.

2. A mechanism as set forth in claim 1, wherein said strips are joined by living hinges integral therewith, the platform being formed of polypropylene.

3. A mechanism as set forth in claim 1, wherein each strip includes a sprocket hole, and said means to advance said platform includes a sprocket wheel having spokes engaging the sprocket holes in successive strips.

4. A mechanism as set forth in claim 1, wherein each piece is in the form of a molded figure of a musician.

5. A mechanism as set forth in claim 1, wherein said set of elements is constituted by chimes of progressively different length.

6. A mechanism, as set forth in claim 1, wherein said pins are of different length to raise said hammer heads to different heights.

References Cited

UNITED STATES PATENTS

| 1,547,183 | 7/1925 | Steele | 84—102 |
| 2,630,655 | 3/1953 | Duncan | 84—94 |
| 2,812,680 | 11/1957 | Fedoryszyn | 84—102 |

FOREIGN PATENTS

| 928,926 | 12/1947 | France. |

RICHARD B. WILKINSON, *Primary Examiner.*

LAWRENCE R. FRANKLIN, *Assistant Examiner.*

U.S. Cl. X.R.

46—122, 191; 84—404